(12) United States Patent
Kumar et al.

(10) Patent No.: US 10,542,116 B2
(45) Date of Patent: Jan. 21, 2020

(54) COMMUNICATION DEVICE AND METHOD FOR PROCESSING RECEIVED DATA

(71) Applicant: Intel IP Corporation, Santa Clara, CA (US)

(72) Inventors: Atul Kumar, Bijnor (IN); Vinayak Bellur, Bangalore (IN); Ankush Jain, Indore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/342,542

(22) PCT Filed: Mar. 14, 2018

(86) PCT No.: PCT/US2018/022296
§ 371 (c)(1),
(2) Date: Apr. 17, 2019

(87) PCT Pub. No.: WO2018/182971
PCT Pub. Date: Oct. 4, 2018

(65) Prior Publication Data
US 2019/0297168 A1    Sep. 26, 2019

(30) Foreign Application Priority Data
Mar. 31, 2017 (EP) ..................... 17164186

(51) Int. Cl.
| *G06F 15/173* | (2006.01) |
| *H04L 29/08* | (2006.01) |
| *H04W 28/02* | (2009.01) |
| *H04W 52/02* | (2009.01) |
| *H04L 12/851* | (2013.01) |
| *H04L 29/06* | (2006.01) |
| *H04L 1/00* | (2006.01) |

(52) U.S. Cl.
CPC .......... *H04L 67/322* (2013.01); *H04L 1/0017* (2013.01); *H04L 47/2425* (2013.01); *H04L 65/80* (2013.01); *H04W 28/0268* (2013.01); *H04W 52/028* (2013.01); *H04W 52/0287* (2013.01)

(58) Field of Classification Search
CPC . H04L 67/322; H04L 47/2425; H04L 1/0017; H04L 65/80; H04W 28/0268
See application file for complete search history.

(56) References Cited

U.S. PATENT DOCUMENTS

| 2012/0108224 | A1 | 5/2012 | Cheng et al. |
| 2012/0120828 | A1 | 5/2012 | Anderson et al. |
| 2015/0026398 | A1 | 1/2015 | Kim |
| 2016/0050712 | A1 | 2/2016 | Kim et al. |

OTHER PUBLICATIONS

Extended European Search Report for corresponding EP Patent Application No. 17 16 4186.3 dated Sep. 7, 2017, 8 pages.
Communication pursuant to Article 94(3) EPC for corresponding EP Patent Application No. 17 16 4186.3, dated Apr. 20, 2018, 4 pages.

*Primary Examiner* — Kyung H Shin
(74) *Attorney, Agent, or Firm* — Viering, Jentschura & Partner MBB

(57) ABSTRACT

A communication device is described comprising a receiver configured to receive data comprising information representing a required quality of service of the transmission of the data, hardware resources configured to perform a processing of the data and a controller configured to set a speed of the processing of the data by the hardware resources based on the determined required quality of service.

20 Claims, 8 Drawing Sheets

COMMUNICATION DEVICE AND METHOD FOR PROCESSING RECEIVED DATA

CROSS-REFERENCE TO RELATED APPLICATIONS

This application is a national stage entry according to 35 U.S.C. § 371 of PCT Application No. PCT/US2018/022296 filed on Mar. 14, 2018, which claims priority to European Patent Application Serial No. 17 164 186.3 filed on Mar. 31, 2017, both of which are incorporated herein by reference in their entirety.

TECHNICAL FIELD

Exemplary implementations described herein generally relate to communication devices and methods for processing received data.

BACKGROUND

Reduction of power consumption of portable communication devices, e.g. portable phones, is a typical aim since a long battery life is an important feature for a portable device. Since a large amount of power is required for the protocol stack processing of received data, approaches that allow reducing the power consumption of hardware resources performing protocol stack processing are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
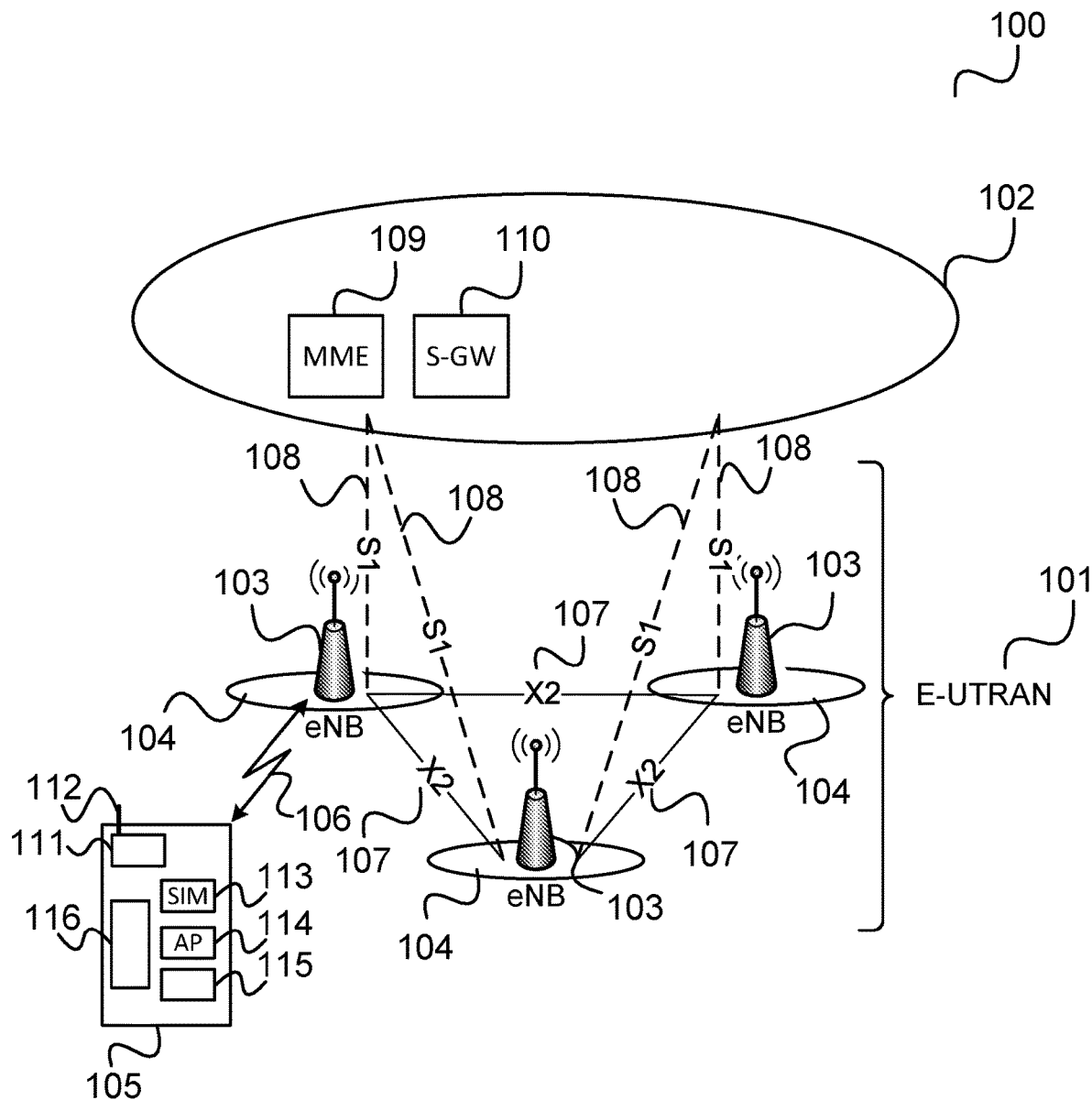
FIG. 1 shows a communication system, e.g. an LTE (Long Term Evolution) communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

For radio communication via the air interface 106, the mobile terminal 105 includes a radio transceiver 111 and one or more antennas 112 and one or more multiple subscriber identity modules 113. The mobile terminal 105 also includes an application processor 114 as well as a main memory 115 for running applications. The mobile terminal 105 further includes a battery 116 for power supply. The mobile terminal 105 may include further components such as a display, a speaker, a microphone etc.

The LTE UE architecture data plane processing is divided in physical layer, protocol stack layer and application layer, e.g. according to the OSI (Open System Interconnection) reference model, wherein the protocol stack layer for example include communication layers between the physical layer and the application layer such as the data link layer, the network layer and the transport layer, e.g. the MAC (Medium Access Control) layer and the RRC (Radio Resource Control) layer in case of LTE.

The implementation at each of these layers utilize their respective processing cores, memories and hardware accelerators (e.g. corresponding to or of transceiver 111, application processor 114 and memory 115) in order to meet latency, and Quality-of-Service (QoS) Class Identifier (QCI) requirements of an end user application running on application processor 114. While meeting QCI (i.e. quality-of-service) requirements of the user application is typically strictly required, these requirements should typically be met under stringent power consumption requirements, to ensure longer battery life at the UE 105.

According to the approaches described in the following, a scheme to dynamically adapt the data transfer rates across the above-mentioned communication layers as a function of available information on application specific QCI parameters (e.g. one or more QCIs) is used. This scheme, also referred to as QCI aware control scheme in the following, can significantly contribute towards power saving at the UE 105.

The scheme for example includes dynamically turning off hardware accelerators and dynamically controlling a processor core clock (e.g. of application processor 114 or a baseband processor of transceiver 111) keeping in view the user application QCI requirements.

This scheme, described in more detail in the following according to various examples, for example allows reducing overall UE power consumption by:
- using QCI information (e.g. information representing the QCI for received data) available at the protocol stack layer to efficiently exploit allowed data latency for a given application;
- adaptively controlling one or more processor clocks (e.g. clock frequencies) based on allowed application data latency derived from the QCI information;
- Adaptively shutting down hardware accelerators used in the data processing layers based on allowed application data latency derived from the QCI information.

It should be noted that this scheme can be implemented without negative impact on control signaling and without negative impact on the performance of delay tolerant applications.

The 3GPP standard specifies an EPS bearer setup to transfer data from network (PDN) to UE. An EPS bearer can have multiple data radio bearers (DRBs), which are configured to UE via control signaling (rrcConnectionSetup and/or rrcConnectionReconfiguration) with defined DRBs characteristics including QCI (QoS) levels.

Figure 2:
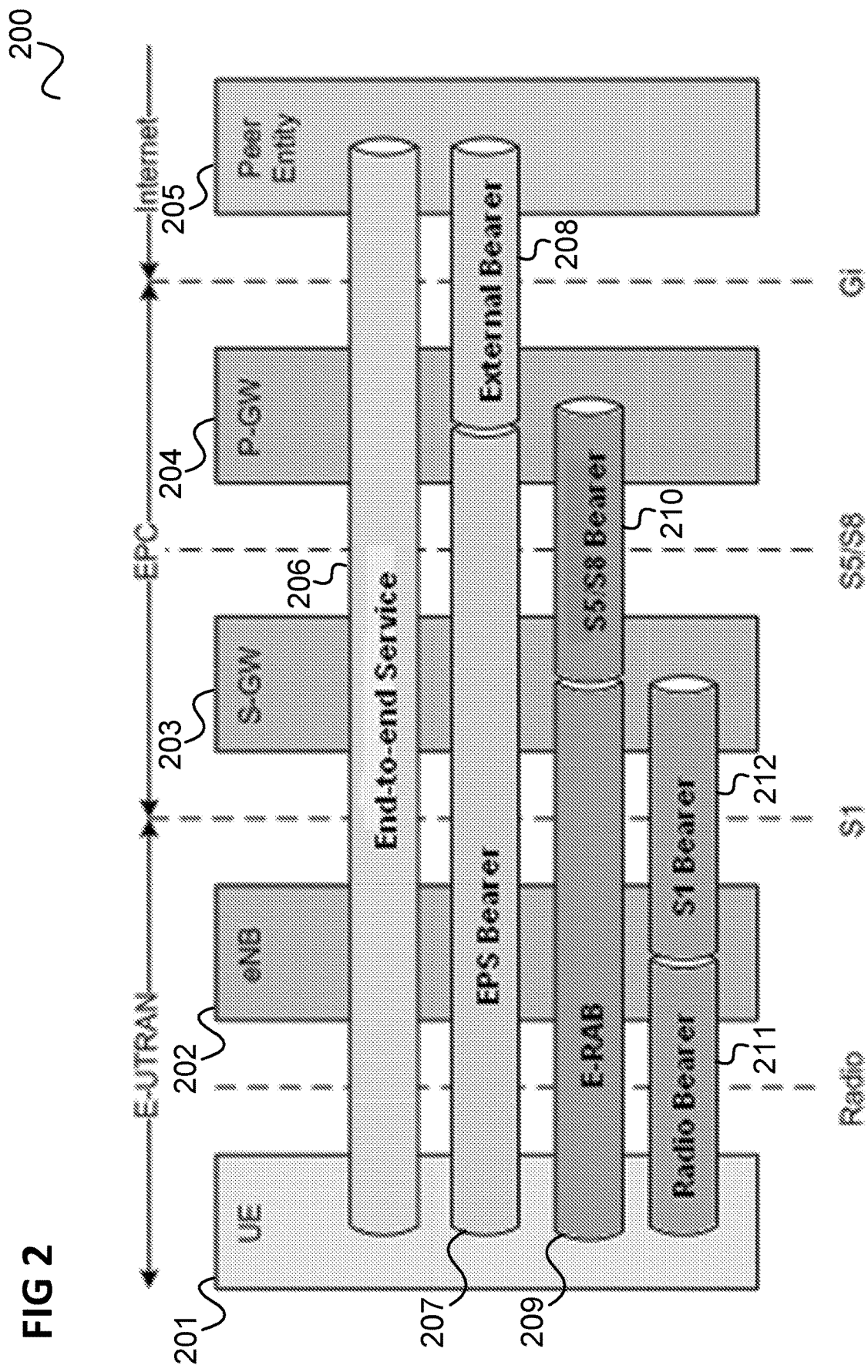
FIG. 2 illustrates an LTE Bearer Service Architecture for providing an end-to-end service between a UE (User Equipment) and a peer entity.

FIG. 2 illustrates the LTE Bearer Service Architecture for providing an end-to-end service 206 (e.g. a communication connection such as a voice call) between a UE 201 and a peer entity 205 (e.g. another UE or a server in the Internet).

The end-to-end service 206 is provided for an application running on the UE 201 and is provided by means of an EPS bearer 207 and an external bearer 208.

An E-RAB 209 transports the packets of the EPS bearer 207 between the UE 201 and an EPC including an S-GW 203 and a P-GW (packet data network gateway) 204 (which may be part of core network 102). When an E-RAB 209 exists, there is a one-to-one mapping between this E-RAB 209 and the EPS bearer 207.

A data radio bearer 211 transports the packets of the EPS bearer 207 between the UE 201 and an eNB 202. When a data radio bearer 211 exists, there is a one-to-one mapping between this data radio bearer 211 and the EPS bearer 207 and the E-RAB 209.

An S1 bearer 212 transports the packets of the E-RAB 209 between the eNodeB 202 and the Serving GW 203.

An S5/S8 bearer 210 transports the packets of the EPS bearer 207 between the Serving GW 203 and the PDN GW 204.

According to various examples, according to the QCI aware control scheme described herein:
- the QCI level of a 211 DRB is used in the protocol stack layer by an entity e.g. implemented as Data Link Coprocessor (hereafter referred to as DLC) or DLC module;
- the DLC uses the QCI level to decide on packet buffering duration, and to align on the rate of packet transfer across physical layer, protocol stack layer, and application layer;
- the DLC bunches together (groups) packet streams from delay tolerant applications, and based on the tolerable buffering duration, the DLC dynamically controls one or more processor core clocks and controls the usage of (UE) hardware resources, in accordance with the buffering duration, e.g. controls processing resources to enter a low power mode during the buffering duration and suspends processing of received data on protocol stack layer during the buffering duration. The hardware resources may include one or more hardware processing units, e.g. a hardware accelerator such as a dedicated processor, e.g. a digital signal processor, a crypto-processor, a decoder (e.g. a turbo decoder), a FFT (Fast Fourier Transformation) processor. A processing unit may for example be implemented as a programmable processor or as an ASIC (Application Specific Integrated Circuit) etc. The hardware resources may form at least a part of a baseband processor of the communication device (e.g. a UE). The hardware resources may further comprise one or more memories, one or more direct memory access controllers and any other hardware involved in the processing (e.g. protocol stack processing) of received data.

This allows optimizing overall power consumption in the UE 201 during full data throughput, particularly when it runs one or more delay tolerant applications.

The scheme may include utilizing QCI information to distinguish time critical (low latency) and normal (high latency) data applications at an LTE sub frame (TTI) level and controlling hardware (HW) resource usage based on the QCI level, e.g. dynamically adapting the control clock of a data processor core as a function of the QCI level.

Figure 3:
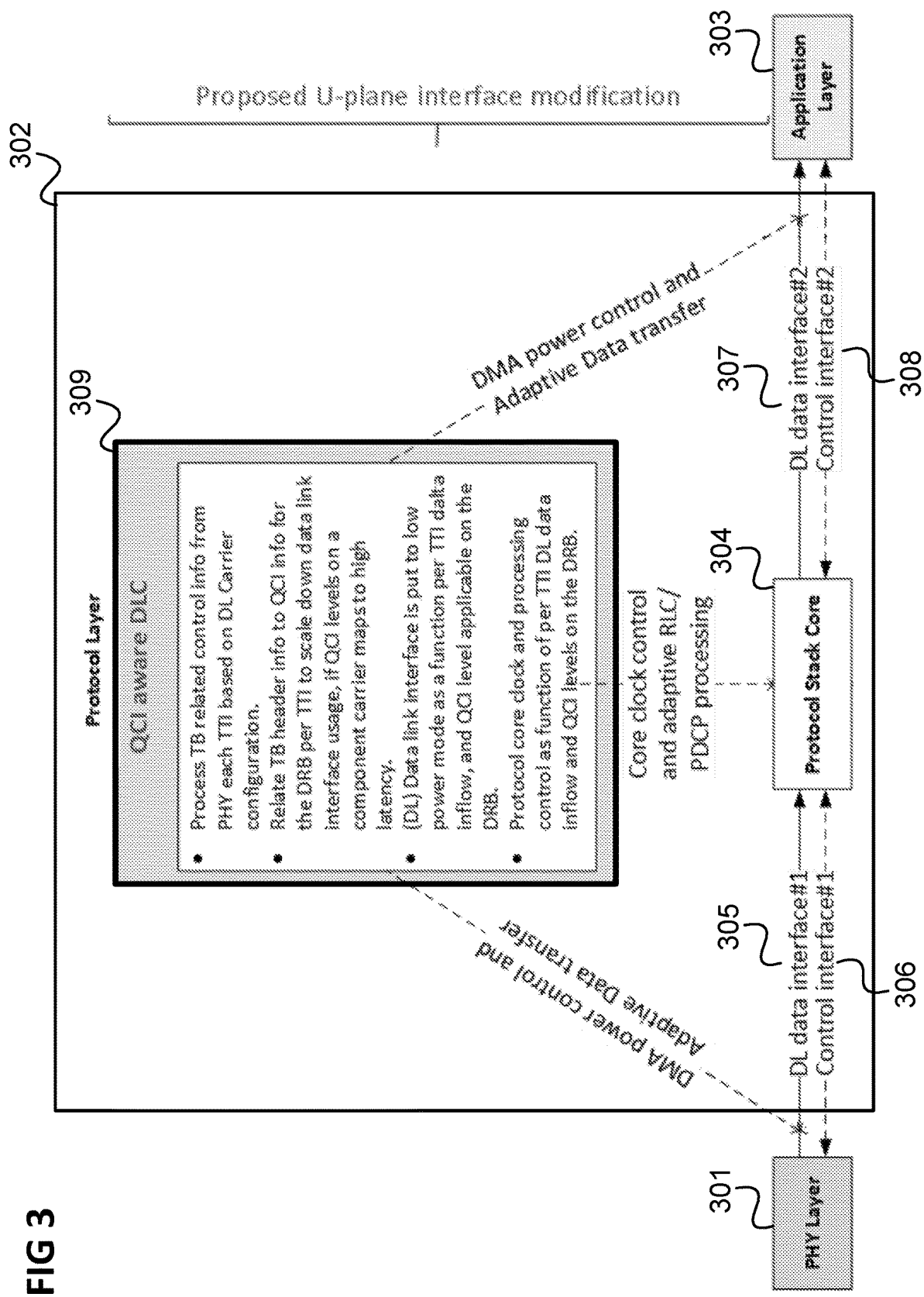
FIG. 3 illustrates the functionality of a Data Link Coprocessor (DLC) which operates within the protocol layer.

FIG. 3 illustrates the functionality of a Data Link Coprocessor (DLC) 309 which operates within the protocol layer 302.

The protocol layer 302 further includes a protocol stack core 304, e.g. implemented by one or more components of the transceiver 111 such as a baseband processor. The protocol stack core 304 is coupled with components of the physical layer 301 (such as antenna 112 and physical layer components of the transceiver 111) via a first downlink data interface 305 and a first downlink control interface 306. Further, the protocol stack core 304 is coupled with components of the application layer 303 (e.g. the application processor 114) by means of a second downlink data interface 307 and a second control interface 308.

The DLC 309 may perform DMA (direct memory access) power control and perform adaptive data transfer control by controlling various components of the UE. For example, the DLC 309 may perform a core clock control and adaptive RLC (Radio Link Control)/PDCP (Packet Data Convergence Protocol) processing control by a corresponding control of the protocol stack core 304.

For this, the DLC 309 may

Process transport block (TB) related control information (e.g. TB header information) provided by the physical layer 301 each TTI based on the downlink (DL) carrier configuration;

Relate TB control information to QCI information for the corresponding DRB per TTI to scale down data link interface usage if QCI levels on a component carrier maps to high latency;

Put a DL data interface 305, 307 to low power mode as a function of per TTI data inflow and the QCI level applicable for the DRB;

Control protocol core clock and processing as function of per TTI DL data inflow and the QCI level applicable for the DRB.

These actions allow for example to improve performance regarding UE power consumption when it is engaged in a high throughput data session.

A current consumption comparison between a UE with a QCI aware DLC, i.e. with an LTE subsystem employing the QCI aware control scheme as for example illustrated in FIG. 3 and a legacy design in which the data link interfaces 305, 307 are kept powered as a function of active DL data carriers and protocol layer core clock domains are configured as a function of the number of active DL data carriers shows significant power savings can be achieved with the QCI aware DLC.

The QoS Class Identifier (QCI) is a mechanism used in 3GPP LTE networks to ensure that a data radio bearer 211 is allocated appropriately to a required Quality of Service (QoS). Different bearer traffic requires different QoS and therefore different QCI values. QCI value 9 is typically used for the default bearer of a UE/PDN for non-privileged subscribers. The QoS concept used in LTE networks defines data packet forwarding treatment where each bearer type is assigned one QoS Class Identifier (QCI) by the network. Table 1 gives examples for the standardized QCI characteristics with maximum latency associated with each QCI level.

According to various examples, the QCI aware DLC design classifies user applications into groups based on QCI levels across different data link interfaces in the UE architecture e.g. the downlink data interfaces 305, 307 of FIG. 3.

With reference to the data interfaces 305, 307 of FIG. 3 and table 1 the following cases are for example considered for delay tolerant applications for power optimization:

Case 1: With packet delay budget equal or above 300 ms, according to the QCI aware DLC design, a 4 ms packet buffering delay at the first downlink data interface 305 and 8 ms buffering delay at the second downlink data interface 307 for QCI levels 4, 6, 8 and 9 are introduced.

Case 2: With packet delay budget equal or above 100 ms and smaller than 300 ms, according to the QCI aware DLC design, a 2 ms packet buffering delay at the first downlink data interface 305 and a 4 ms buffering delay at the second downlink data interface 307 for QCI levels 2 and 7 are introduced.

During the buffering delay introduced at the downlink data interfaces 305, 307, protocol stack processing (e.g. by protocol stack core 304) is suspended (or at least carried out at reduced processing speed), protocol stack core clocks are put into low power mode (i.e. the clock frequency is reduced) and the associated DMA hardware is turned off. These measures do not have any negative impact on end user experience in case 1 and case 2.

For delay sensitive applications with packet delay budget below 100 ms, and for RRC signaling messages, the QCI aware DLC design may for example keep the flow control at the downlink data interfaces 305, 307 unchanged, i.e. no delay is introduced.

In the following, further details about the flow of user data and control data across the LTE_PHY and LTE_HOST subsystems during a full DL throughput scenario according to various examples of a QCI aware DLC design are given with respect to FIG. 4. In particular, the role and description

TABLE 1

| QCI | Resource Type | Priority Level | Packet Delay Budget | Packet Error Loss Rate | Example Services |
|---|---|---|---|---|---|
| 1 | GBR | 2 | 100 ms | $10^{-2}$ | Conversational Voice |
| 2 |  | 4 | 150 ms | $10^{-3}$ | Conversational Video (Streaming) |
| 3 |  | 3 | 50 ms | $10^{-3}$ | Real Time Gaming |
| 4 |  | 5 | 300 ms | $10^{-6}$ | Non-Conversational Video (Buffered Streaming) |
| 65 |  | 0.7 | 75 ms | $10^{-2}$ | Mission Critical user plane Push To Talk voice (e.g., MCPTT) |
| 66 |  | 2 | 100 ms | $10^{-2}$ | Non-Mission-Critical user plane Push To Talk voice |
| 5 | Non-GBR | 1 | 100 ms | $10^{-6}$ | IMS Signaling |
| 6 |  | 6 | 300 ms | $10^{-6}$ | Video (Buffered Streaming) TCP-based (e.g., www, e-mail, chat, ftp, p2p file sharing, progressive video, etc.) |
| 7 |  | 7 | 100 ms | $10^{-3}$ | Voice, Video (Live Streaming) Interactive Gaming |
| 8 |  | 8 | 300 ms | $10^{-6}$ | Video (Buffered Streaming) TCP-based (e.g., www, e-mail, chat, ftp, p2p file Sharing, progressive video, etc.) |
| 9 |  | 9 |  |  |  |
| 69 |  | 0.5 | 60 ms | $10^{-6}$ | Mission Critical delay sensitive signaling (e.g., MC-PTT signaling) |
| 70 |  | 5.5 | 200 ms | $10^{-6}$ | Mission Critical Data (e.g. example services are the same as QCI 6/8/9) | of the modules in these subsystems that contribute to improved power consumption is described.

Figure 4:
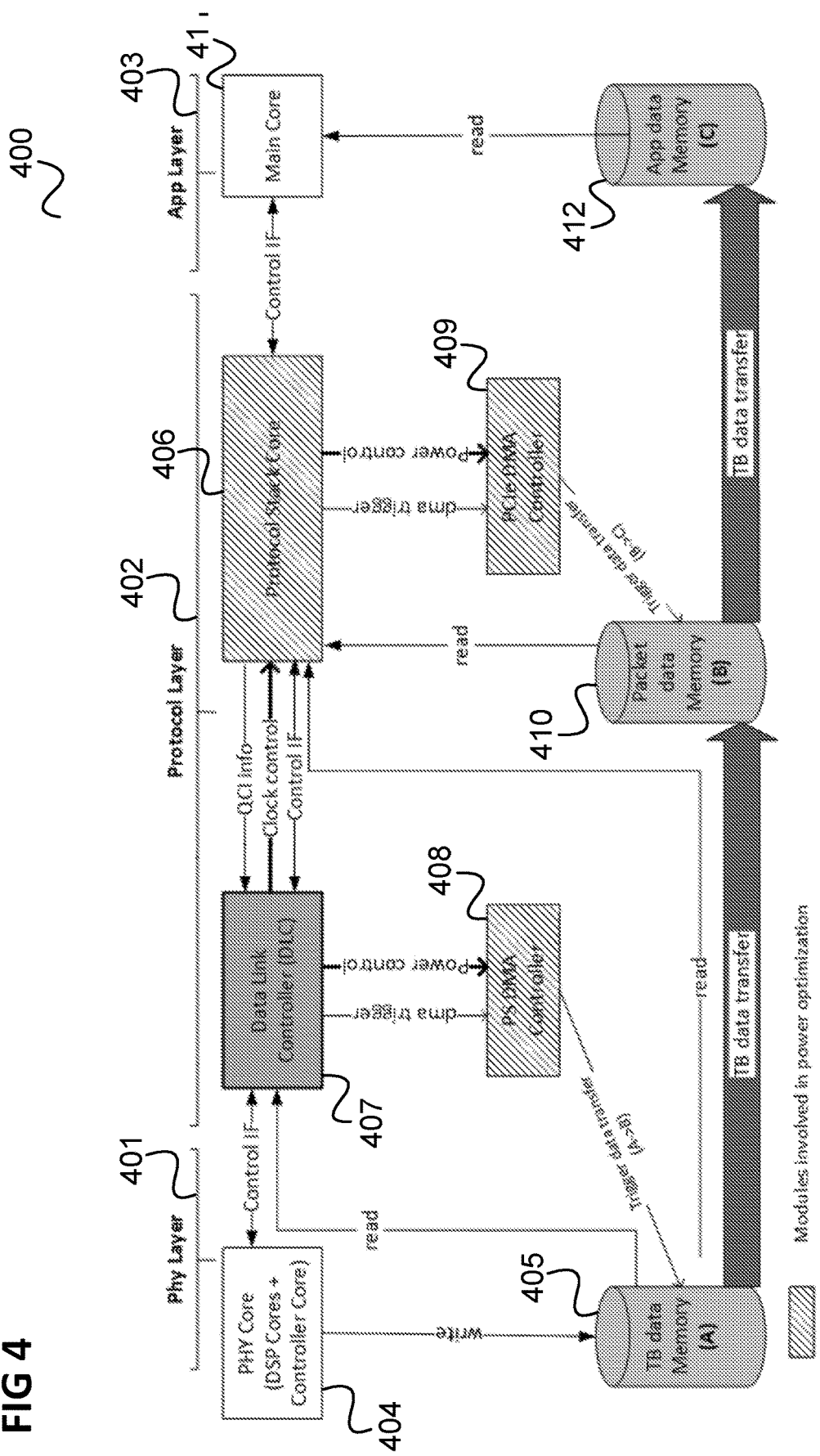
FIG. 4 shows a UE system architecture, e.g. of the UE of FIG. 1.

FIG. 4 shows a UE system architecture 400, e.g. of the UE 105 of FIG. 1.

The UE architecture 400 includes a LTE_PHY subsystem of the physical Layer 401 which includes a PHY core 404 (including DSP cores and a PHY controller core), HW accelerators and memories and drivers, in particular a transport block (TB) data memory 405.

The UE architecture 400 further includes an LTE_HOST subsystem of the protocol layer 402 which includes a protocol stack (PS) core 406, a data link coprocessor or data link controller (DLC) 407, a PS DMA controller 408, a PCIe DMA controller 409 and memories and drivers, in particular a packet data memory 410.

The UE architecture 400 further includes an LTE_APP subsystem on application layer 403 which includes an application core 411, e.g. corresponding to application processor 114, and memories and drivers, in particular an application data memory 412, e.g. corresponding to memory 115.

Figure 5:
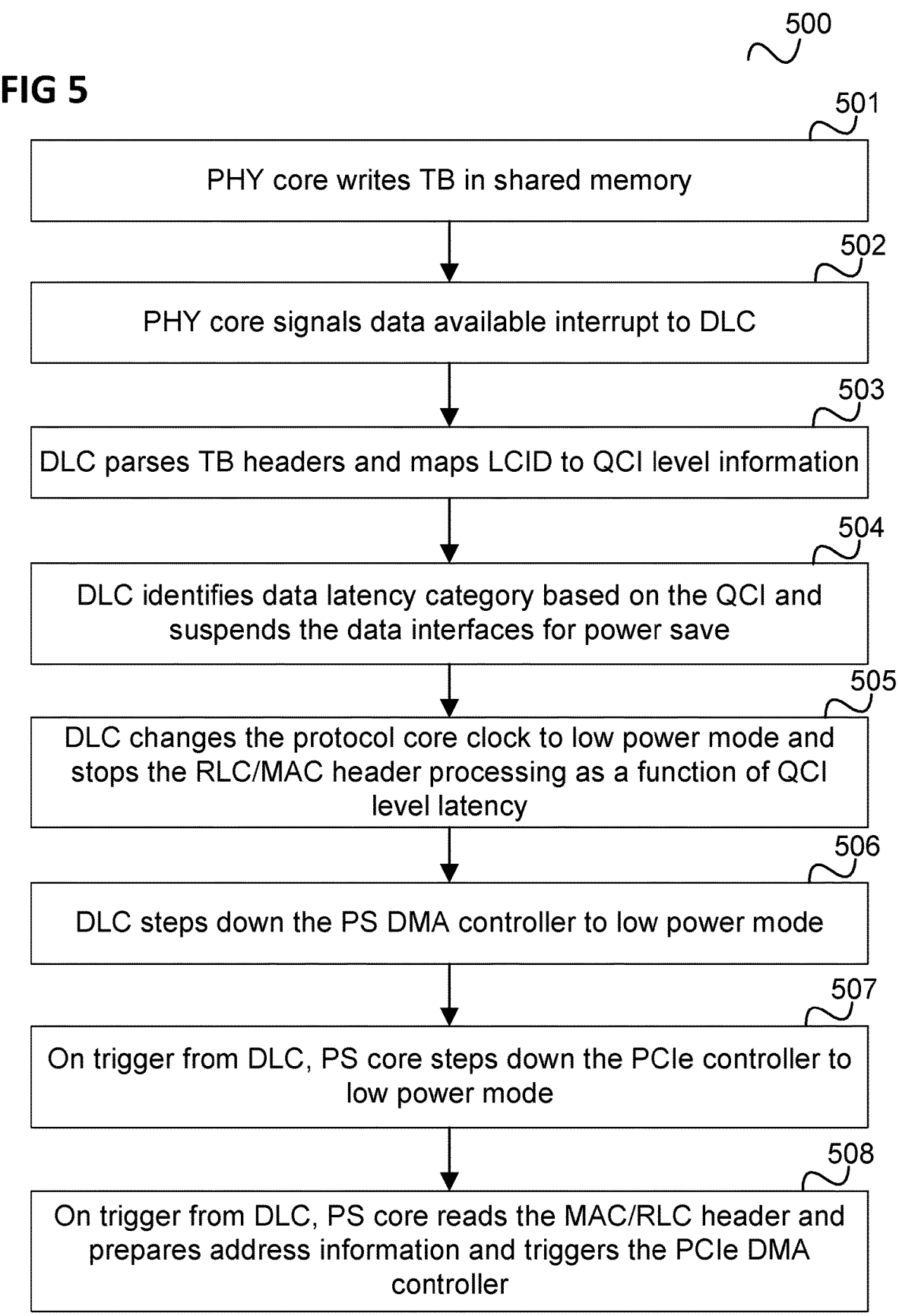
FIG. 5 shows an operation flow of the UE system architecture of FIG. 4 in context of a QCI (Quality-of-Service Class Identifier) based control of the processing speed of received data.

FIG. 5 shows an operation flow of the UE system architecture 400 in context of a QCI based control of the processing speed of received data.

The DLC 407 enables discontinuous data processing and data transfer across the layers 401, 402, 403 to achieve the power savings as HW resources are not always on but instead are adapted based on the data latency that is tolerable.

In 501, the PHY Core 404 writes a decoded transport block every TTI depending on the DL grants into the TB data memory 405, which is shared between the LTE_PHY and the LTE_HOST subsystem, i.e. to which the LTE_HOST subsystem has access.

In 502, when transport blocks are written into the TB data memory 405, the PHY Core 404 signals a data available interrupt towards the DLC 407 in the LTE_HOST subsystem.

In 503, the DLC 407 receives and reacts to the data available interrupt. The DLC parses the TB header(s) including the LCID (logical identity). The LCID maps to a QCI (or, in other words, a QCI level, e.g. a quality-of-service level as specified by the QCI such that the DLC 407 can determine the QCI for the data based on the LCID. The QCI levels applicable for the current data transfer session are available to the DLC 407 as a semi-static configuration from the protocol stack (at RRC Connection Setup for the corresponding connection via which the transport blocks are transmitted).

In 504, the DLC 407 identifies a data latency category (e.g. Class A or Class B) based on the QCI level to suspend the data interfaces across the layers.

In 505, based on the identified data latency category, the DLC 407 changes the clock of the protocol core 406 to a low power mode and stops RLC/MAC header processing.

In 506, also, the DLC 407 steps down the PS DMA controller 408 to low power mode for power save.

In 507, on trigger from the DLC 407, the protocol stack core 406 steps down the PCIe DMA controller 409 to low power mode until it is again needed to be powered on.

In 508, on trigger from DLC 407, the protocol stack core 406 reads the MAC/RLC headers from the received transport blocks and prepares data address information and triggers the PCIe DMA controller 409 for data transfer.

Figure 6:
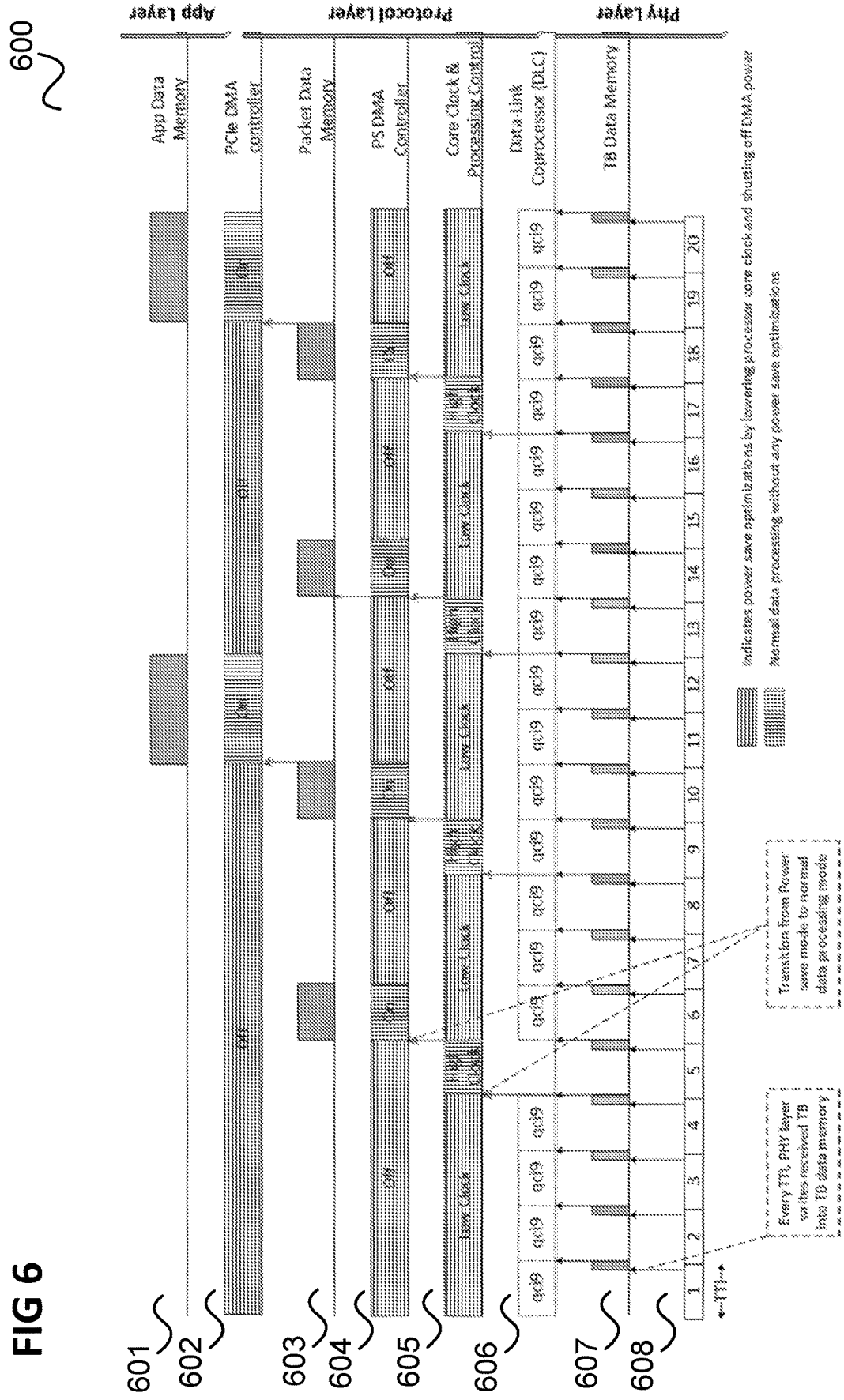
FIG. 6 shows a timing diagram for the operation described with reference to FIG. 5.

FIG. 6 shows a timing diagram 600 for the operation described with reference to FIG. 5.

In FIG. 6, time flows from left to right.

A first sub-diagram 601 indicates accesses to the application data memory 412.

A second sub-diagram 602 indicates on and off times of the PCIe DMA controller 409.

A third sub-diagram 603 indicates accesses to the packet data memory 410.

A fourth sub-diagram 604 indicates on and off times of the PS DMA controller 408.

A fifth sub-diagram 605 indicates the clock levels of the protocol stack core 406 (wherein a lock clock period corresponds to a period during which protocol stack processing of received data is stopped (i.e. suspended) and a high clock period corresponds to a period during which protocol stack processing of received data is performed).

A sixth sub-diagram 606 indicates the QCI (in this example QCI=9) which is used by the DLC 407 as a basis for the control of the speed of processing of received data.

A seventh sub-diagram 607 indicates accesses to the transport block memory 405.

An eighth sub-diagram 608 indicates the TTIs (and thus defines the time reference).

In particular, the timing diagram 800 illustrates how a QCI (e.g. QCI=9) based data interface control gives significant power save while meeting the QoS requirements.

Figure 7:
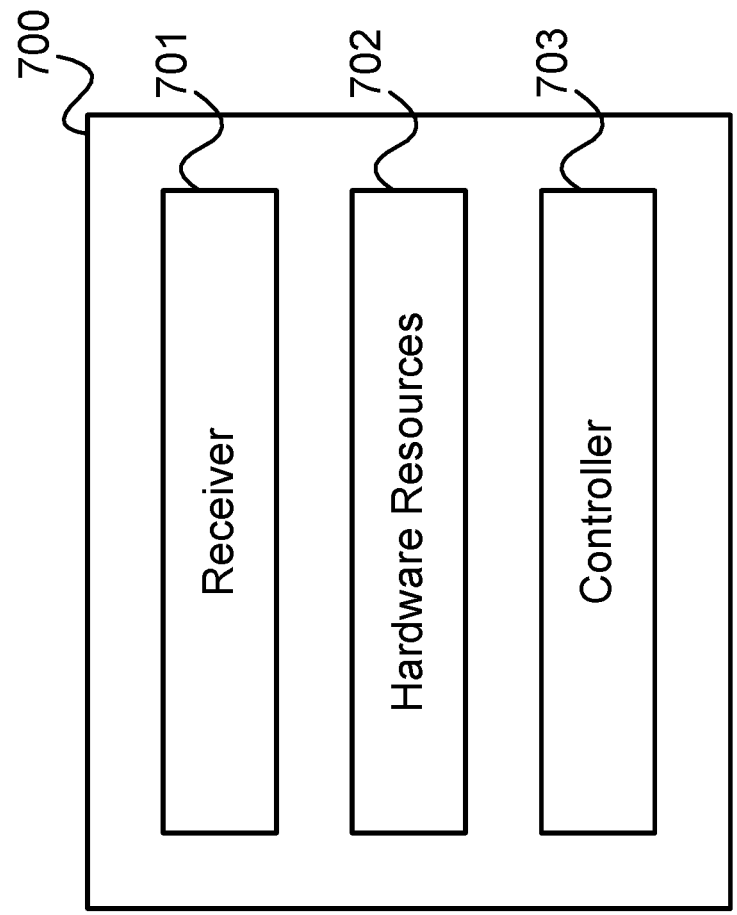
FIG. 7 shows a communication device.

In summary, according to various examples, a communication device is provided as illustrated in FIG. 7.

FIG. 7 shows a communication device 700.

The communication device 700 includes a receiver 701 configured to receive data including information representing a required quality of service of the transmission of the data.

Further, the communication device 700 includes hardware resources 702 configured to perform a processing of the data.

The communication device 700 further includes a controller 703 configured to set a speed of the processing of the data by the hardware resources 702 based on the determined required quality of service.

According to various examples, in other words, the speed of processing of received data is set based on a required quality of service of its transmission. This may involve a processing at a normal (or maximum) processing speed, which may correspond to a processing which takes the most power, or a delayed processing, i.e. a processing below the normal (or maximum) processing speed which uses less power and which is used when the required quality of service allows it. In other words, a communication device sets the performance of hardware resources based on a determined data transmission quality requirement and for example sets a reduced (or lower) performance when the transmission quality requirement allows it, i.e. when it determines that the transmission quality requirement can be fulfilled with the reduced p.

The data transmission quality requirement is for example a maximum latency of the data transmission, e.g. a maximum time that the data may take to be transmitted from endpoint to endpoint on the application layer. It should be noted that the endpoint to endpoint transmission on application layer includes the protocol stack processing such that a delay of the protocol stack processing is part of the (application layer) data transmission latency.

An idea on which various examples are based can be seen in that a communication device determines whether it is possible to reduce its power consumption by reducing the performance of its hardware resources, e.g. by reducing the hardware resource's average performance over time by allowing periods during which data processing is suspended and the hardware resources may enter a low power mode (or at least a mode with lower performance and lower power consumption) in view of a transmission quality requirement (or quality of service).

Figure 8:
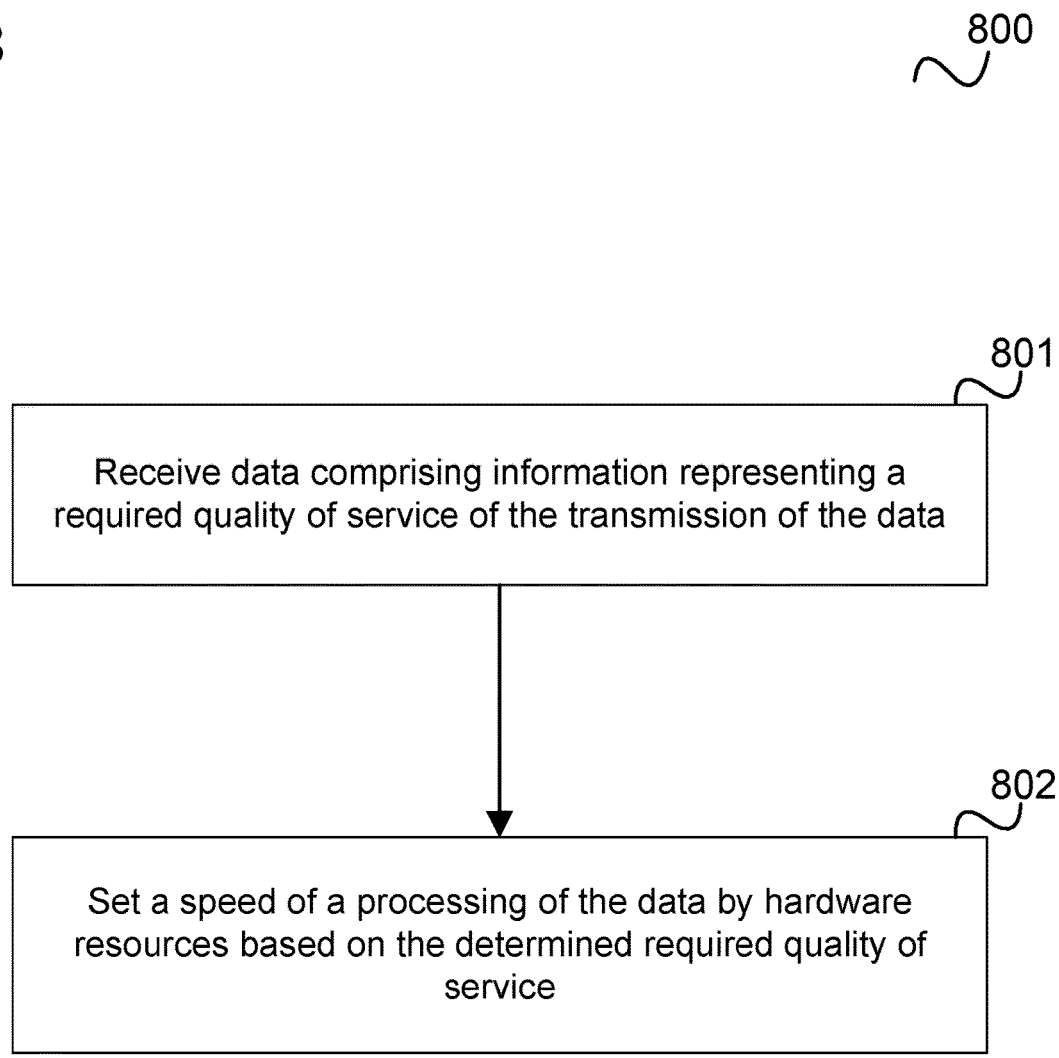
FIG. 8 shows a flow diagram illustrating a method for processing received data.

The communication device 700 for example carries out a method as illustrated in FIG. 8.

FIG. 8 shows a flow diagram 800 illustrating a method for processing received data, for example carried out by a communication device.

In 801, the communication device receives data including information representing a required quality of service of the transmission of the data.

In 802, the communication device sets a speed of a processing of the data by hardware resources based on the determined required quality of service.

The components of the communication device (e.g. the receiver and the controller, which may for example correspond to a data link coprocessor as described above) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The following examples pertain to further exemplary implementations.

Example 1 is a communication device as illustrated in FIG. 7.

In Example 2, the subject-matter of Example 1 may optionally include the quality of service including a data transmission latency requirement for the transmission of the data.

In Example 3, the subject-matter of any one of Examples 1-2 may optionally include the controller being configured to set the processing speed to a first processing speed if the required quality of service is a above a predetermined threshold and to set the processing speed to a second processing speed lower than the first processing speed if the required quality of service is at or below the predetermined threshold.

In Example 4, the subject-matter of any one of Examples 1-3 may optionally include the processing of the data including a protocol stack processing of the data In Example 5, the subject-matter of any one of Examples 1-4 may optionally include the controller being configured to determine an allowable delay of the processing of the data based on the required quality of service and to set the speed of the processing of the data based on the allowable delay.

In Example 6, the subject-matter of any one of Examples 1-5 may optionally include the controller being configured to the set the speed of the processing of the data by setting a buffering time for the data based on the allowable delay.

In Example 7, the subject-matter of Example 6 may optionally include the controller being configured to suspend processing of the data during the buffering time.

In Example 8, the subject-matter of Example 6 may optionally include the controller being configured to control the hardware resources to enter a low power mode during the buffering time In Example 9, the subject-matter of Example 8 may optionally include controlling the hardware resources to enter a low power mode including one or more of reducing a clock frequency of a clock of a hardware resource, deactivation of a hardware accelerator and deactivation of direct memory access hardware.

In Example 10, the subject-matter of any one of Examples 1-9 may optionally include an application processor configured to execute an application wherein the data is data received for the application and the quality of service is a quality of service required by the application.

In Example 11, the subject-matter of Example 10 may optionally include the data including data received for multiple applications executed by the application processor.

In Example 12, the subject-matter of any one of Examples 1-11 may optionally include the information representing the required quality of service being header information.

In Example 13, the subject-matter of any one of Examples 1-12 may optionally include the information representing the required quality of service corresponds a Quality-of-Service Class Identifier.

In Example 14, the subject-matter of any one of Examples 1-13 may optionally include the information representing the required quality of service being a logical channel identity of a logical channel associated with the data.

In Example 15, the subject-matter of any one of Examples 1-14 may optionally include the controller being configured to determine a Quality-of-Service Class Identifier based on the information representing the required quality of service.

In Example 16, the subject-matter of any one of Examples 1-15 may optionally include the communication device being a portable communication device including a battery powering the hardware resources.

In Example 17, the subject-matter of any one of Examples 1-16 may optionally include the communication device being a communication terminal.

In Example 18, the subject-matter of any one of Examples 1-17 may optionally include the communication device being a subscriber terminal of a cellular mobile communication network.

Example 19 is a method for processing received data as illustrated in FIG. 8.

In Example 20, the subject-matter of Example 19 may optionally include the quality of service including a data transmission latency requirement for the transmission of the data.

In Example 21, the subject-matter of any one of Examples 19-20 may optionally include setting the processing speed to a first processing speed if the required quality of service is a above a predetermined threshold and setting the processing speed to a second processing speed lower than the first processing speed if the required quality of service is at or below the predetermined threshold.

In Example 22, the subject-matter of any one of Examples 19-21 may optionally include the processing of the data including a protocol stack processing of the data In Example 23, the subject-matter of any one of Examples 19-22 may optionally include determining an allowable delay of the processing of the data based on the required quality of service and setting the speed of the processing of the data based on the allowable delay.

In Example 24, the subject-matter of any one of Examples 19-23 may optionally include setting the speed of the processing of the data by setting a buffering time for the data based on the allowable delay.

In Example 25, the subject-matter of Example 24 may optionally include suspending processing of the data during the buffering time.

In Example 26, the subject-matter of any one of Examples 24-25 may optionally include controlling the hardware resources to enter a low power mode during the buffering time In Example 27, the subject-matter of Example 26 may optionally include controlling the hardware resources to enter a low power mode including one or more of reducing a clock frequency of a clock of a hardware resource, deactivation of a hardware accelerator and deactivation of direct memory access hardware.

In Example 28, the subject-matter of any one of Examples 19-27 may optionally include executing an application wherein the data is data received for the application and the quality of service is a quality of service required by the application.

In Example 29, the subject-matter of Example 28 may optionally include the data including data received for multiple applications which are executed.

In Example 30, the subject-matter of any one of Examples 19-29 may optionally include the information representing the required quality of service being header information.

In Example 31, the subject-matter of any one of Examples 19-30 may optionally include the information representing the required quality of service corresponds a Quality-of-Service Class Identifier.

In Example 32, the subject-matter of any one of Examples 19-31 may optionally include the information representing the required quality of service being a logical channel identity of a logical channel associated with the data.

In Example 33, the subject-matter of any one of Examples 19-32 may optionally include determining a Quality-of-Service Class Identifier based on the information representing the required quality of service.

In Example 34, the subject-matter of any one of Examples 19-33 may optionally be performed by a portable communication device including a battery powering the hardware resources.

In Example 35, the subject-matter of any one of Examples 19-34 may optionally be performed by a communication terminal.

In Example 36, the subject-matter of any one of Examples 19-35 may optionally be performed by a subscriber terminal of a cellular mobile communication network.

According to a further example, a communication terminal is provided including a receiver configured to receive data, a determiner configured to determine a required latency of the reception of the data and a controller configured to delay the processing of the data if the required latency of the reception of the data allows it.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
an application processor configured to execute an application;
a receiver configured to receive data for the application, the data comprising information representing a quality of service required by the application;
hardware resources configured to perform a processing of the data; and
a controller configured to set a speed of the processing of the data by the hardware resources based on a required quality of service, wherein the controller is configured to set the processing speed to a first processing speed when the required quality of service is above a predetermined threshold and to set the processing speed to a second processing speed lower than the first processing speed when the required quality of service is at or below the predetermined threshold, wherein the controller is configured to determine an allowable delay of the processing of the data based on the required quality of service and to set the speed of the processing of the data based on the allowable delay.

2. The communication device of claim 1, wherein the quality of service comprises a data transmission latency requirement for the transmission of the data.

3. The communication device of claim 1, wherein the processing of the data comprises a protocol stack processing of the data.

4. The communication device of claim 1, wherein the controller is configured to set the speed of the processing of the data by setting a buffering time for the data based on the allowable delay.

5. The communication device of claim 4, wherein the controller is configured to suspend processing of the data during the buffering time.

6. The communication device of claim 4, wherein the controller is configured to control the hardware resources to enter a low power mode during the buffering time.

7. The communication device of claim 6, wherein controlling the hardware resources to enter a low power mode comprises one or more of reducing a clock frequency of a clock of a hardware resource, deactivation of a hardware accelerator, or deactivation of direct memory access hardware.

8. The communication device of claim 7, wherein the data comprises data received for multiple applications executed by the application processor.

9. The communication device of claim 1, wherein the information representing the required quality of service is header information.

10. The communication device of claim 1, wherein the information representing the required quality of service corresponds to a Quality-of-Service Class Identifier.

11. The communication device of claim 1, wherein the information representing the required quality of service is a logical channel identity of a logical channel associated with the data.

12. A method for processing received data, the method comprising:
executing an application;
receiving data for the application, the data comprising information representing a quality of service required by the application;
setting a speed of a processing of the data by hardware resources based on a required quality of service, wherein the processing speed is set to a first processing speed when the required quality of service is above a predetermined threshold and the processing speed is set to a second processing speed lower than the first processing speed when the required quality of service is at or below the predetermined threshold; and determining an allowable delay of the processing of the data based on the required quality of service and setting the speed of the processing of the data based on the allowable delay.

13. The method of claim 12, further comprising setting the speed of the processing of the data by setting a buffering time for the data based on the allowable delay.

14. The method of claim 13, further comprising suspending processing of the data during the buffering time.

15. The method of claim 13, further comprising controlling the hardware resources to enter a low power mode during the buffering time.

16. The method of claim 15, wherein controlling the hardware resources to enter a low power mode comprises one or more of reducing a clock frequency of a clock of a hardware resource, deactivation of a hardware accelerator, or deactivation of direct memory access hardware.

17. One or more non-transitory computer-readable media storing instructions thereon that, when executed by at least one processor of a communication device, direct the communication device to process received data comprising:
   executing an application;
   receiving data for the application, the data comprising information representing a quality of service required by the application;
   setting a speed of a processing of the data by hardware resources based on a required quality of service, wherein the processing speed is set to a first processing speed when the required quality of service is above a predetermined threshold and the processing speed is set to a second processing speed lower than the first processing speed when the required quality of service is at or below the predetermined threshold; and
   determining an allowable delay of the processing of the data based on the required quality of service and setting the speed of the processing of the data based on the allowable delay.

18. The one or more non-transitory computer-readable media of claim 17, further comprising setting the speed of the processing of the data by setting a buffering time for the data based on the allowable delay.

19. The one or more non-transitory computer-readable media of claim 18, further comprising suspending processing of the data during the buffering time.

20. The one or more non-transitory computer-readable media of claim 18, further comprising controlling the hardware resources to enter a low power mode during the buffering time.

* * * * *